Patented Oct. 21, 1924.

1,512,485

UNITED STATES PATENT OFFICE.

ADOLFO POUCHAIN, OF TURIN, ITALY.

ELECTRIC ACCUMULATOR.

No Drawing.   Application filed April 18, 1921.   Serial No. 462,348.

*To all whom it may concern:*

Be it known that I, ADOLFO POUCHAIN, a subject of the King of Italy, and resident of Turin, Italy, have invented certain new and useful Improvements in Electric Accumulators, of which the following is a specification.

The present invention relates to electric accumulators comprising negative plates consisting wholly or partly of zinc as active material.

This invention has for its object to obviate the drawbacks found in known accumulators of this class and particularly the attack of the zinc by the electrolyte when the circuit is open, this attack being not completely avoided by known methods of amalgamation, to minimize the uneven deposition of zinc on the negative plate during the charge and to increase the adherence of the deposited zinc on said negative plate, this zinc being apt to detach from the plates and to fall on the bottom of the cell in known accumulators.

It is known that in electric accumulators of the lead-zinc type, the electrolyte must necessarily contain an amount of zinc sulphate for ensuring a full deposition of zinc on the negative plate during the recharging period. Said electrolyte must also contain other substances for the purpose of imparting to the zinc layer deposited during the following charges the property of being immunized, that is of being not attacked by the sulphuric acid of the bath when the circuit is open.

The electrolyte according to this invention consists of diluted sulphuric acid which contains zinc sulphate as well as aluminum sulphate with sulphates of alkaline metals and mercuric sulphate.

Said electrolyte may also contain an addition of an organic substance containing a plurality of alcoholic hydroxyl groups without acid action, preferably glycerine.

The electrolyte may also contain a small amount of a hydrocarbon having a high boiling point such as "reduced oils" made from the residuum of crude oils.

By the use of an electrolyte made according to this invention when the zinc is deposited on the negative plate during the charge and when the positive plate is sulphated during the discharge, the conductivity of the electrolyte always remains very high, and the zinc layer deposited on the negative plate has always a large resistance to the action of sulphuric acid when the circuit is open.

The electrolyte according to this invention is prepared as follows: crystallized zinc sulphate is dissolved nearly to saturation in sulphuric acid of the concentration usual in the accumulators and then are added, also nearly to saturation, the sulphate or sulphates of one or more of the metals aforesaid including a little amount of mercurin sulphate. When an organic substance such as glycerine is added, the amount of said substance may reach 4 per cent as a maximum.

An amount of a high boiling point hydrocarbon, such as a "reduced oil," may be added to the bath, this addition being made to a percentage of 5 per cent by volume of the liquid as a maximum.

By using in a lead-zinc accumulator a bath or electrolyte according to this invention, the zinc deposited on the negative plate during the charging operation is not attacked by the bath when the circuit is open and thus the accumulator may preserve its charge for a long time, say several months; the zinc deposited during the charging operation is evenly distributed on the negative plate and has a strong adherence thereto also in the case the charge is made under a very heavy rate of current.

By the use of the electrolyte according to this invention the various causes are eliminated which may interrupt or interfere with the operation of the accumulators of the described class and are due to the attack of the zinc when the circuit is open, to irregularities in thickness of the zinc deposit and to the falling down of the zinc after it has been deposited.

What I claim as my invention and desire to secure by United States Letters Patent is:—

1. In an electric accumulator comprising zinc as active material, an electrolyte containing sulphuric acid, zinc sulphate, aluminum sulphate, sulphates of alkaline metals and mercury sulphate.

2. In an accumulator comprising zinc as active material, an electrolyte comprising zinc sulphate, aluminum sulphate, sulphates of alkaline metals and glycerine, all dissolved in a water solution of sulphuric acid.

3. In an accumulator comprising zinc as active material, an electrolyte containing sulphuric acid, zinc sulphate, aluminum sulphate, sulphates of alkaline metals, glycerine and a reduced oil made from the residuum of crude oil.

Signed at Turin, Italy, this 26 Mar. 1921.

ADOLFO POUCHAIN.